United States Patent [19]

Shiokama et al.

[11] Patent Number: 4,766,453
[45] Date of Patent: Aug. 23, 1988

[54] BAYONET MOUNT STRUCTURE FOR INTERCHANGEABLE PHOTOGRAPHING LENS TUBE

[75] Inventors: Yoshiharu Shiokama, Kawasaki; Sachio Ohmori, Yokosuka, both of Japan

[73] Assignee: Nippon Kogaku K. K., Tokyo, Japan

[21] Appl. No.: 7,172

[22] Filed: Jan. 27, 1987

[30] Foreign Application Priority Data

Jan. 31, 1986 [JP] Japan .................................. 61-20955

[51] Int. Cl.$^4$ ................................................ G03B 3/00
[52] U.S. Cl. ..................................................... 354/286
[58] Field of Search .......................................... 354/286

[56] References Cited

U.S. PATENT DOCUMENTS 4,536,071 8/1985 Malkawa et al. ............... 354/286 X
4,564,265 1/1986 Miki ................................. 354/286 X

*Primary Examiner*—Michael L. Gellner
*Attorney, Agent, or Firm*—Shapiro and Shapiro

[57] ABSTRACT

A bayonet mount structure for an interchangeable photographic lens unit comprises cooperable lens unit and camera mounts with an optimum arrangement of bayonet pawls, a lock slot and pin for determining rotational position, coupling shafts through which a driving force for auto-focusing is transmitted to the lens unit, electrical contacts for transmitting electrical signals between the lens unit and the camera body, and a mechanical signal surface and signal detector for transmitting optical performance information, such as minimum F-number of the lens unit, to the camera body.

7 Claims, 3 Drawing Sheets

BAYONET MOUNT STRUCTURE FOR INTERCHANGEABLE PHOTOGRAPHING LENS TUBE

BACKGROUND OF THE INVENTION

1. Field of the Invention

The present invention relates to a bayonet mount structure of an interchangeable lens tube. More particularly, the present invention is directed to improvements in the bayonet mount structure of an interchangeable lens tube having a lens system which is moved to focus along the optical axis by a driving motor provided in a camera.

2. Related Background Art

In conventional cameras having an automatic focus detector, the auto-focusing is usually performed by moving a lens system in an interchangeable lens tube to the focus position in accordance with information of deviation from the focus position detected by the automatic focus detector.

One of the known methods for moving the lens system of an interchangeable lens tube is to use a built-in driving motor on the camera body side.

In this type of the auto-focusing driving system, the transmission of the driving power from the built-in motor to the lens system is performed through coupling means comprising two coupling shafts. One of the coupling shafts is provided on the camera side. The coupling shaft is directly connected with the motor at one end. The other end of the camera coupling shaft projects in the direction along the optical axis. The other coupling shaft is provided on the interchangeable lens tube side. The coupling shaft on the lens tube side is so disposed in the lens mount that when the lens tube is mounted on the camera, the free end of the coupling shaft may be coupled with the projecting end of the coupling shaft on the mount of the camera body.

In this type of the auto-focusing camera system, there are provided also electric contacts on both of the mount of the lens tube and the mount of the camera body in order to connect an electric circuit in the lens tube to an electric circuit in the camera body thereby allowing the exchange of information necessary for focusing between the lens tube and the camera body.

As readily understood, the above-mentioned type of interchangeable lens tube has various members arranged in the vicinity of the lens mount. For example, a driving force transmission member (the coupling shaft), information transmission means (the electric contacts) for auto-focusing etc. must be arranged around the lens mount.

Therefore, how to arrange these various members around the lens tube is a very important problem for the above-mentioned type apparatus. The arrangement has to be determined considering the positional relationship between the interchangeable lens tube and the camera body. Further, the arrangement has to be made in such manner as to most effectively utilize the available small space.

SUMMARY OF THE INVENTION

Accordingly, an object of the present invention is to provide an interchangeable lens tube having such a mount structure in which the members required for performing automatic focusing, such as driving force transmission member and electric contacts for transmitting information of the interchangeable lens, are arranged in an optimum manner.

In order attain this object, the bayonet mount structure of an interchangeable photographing lens tube according to the present invention comprises a lens mount fixed to the rear end of the photographing lens tube and three bayonet pawls radially projecting from the outer circumference of the lens mount member. The lens mount member has a mounting reference surface which can be contacted with a reference surface of a mount on the camera containing a motor for auto-focusing.

The camera body has a transmission member for transmitting a driving force from the motor. The transmission member extends from the reference surface of the camera mount. The camera mount and the lens mount are joined together by the three bayonet pawls. Between the first and second bayonet pawls the mounting reference surface has a lock slot formed thereon to position the interchangeable lens tube relative to the camera body. When the interchangeable lens tube is mounted on the camera mount, a positioning member provided on the camera mount engages in the lock slot on the lens mount thereby achieving the relative positioning.

Between the first and third bayonet pawls the mounting reference surface has a through-hole for rotatably supporting a driving force-transmitting shaft. In order to transmit a driving force from the motor to the photographing lens system, the transmission shaft can be coupled with the above-mentioned transmission member on the camera body side.

Further, electric contact means is provided at one end of the second bayonet pawl on the side near the third bayonet pawl. Through said electric contact means the camera body and the interchangeable lens tube are electrically connected with each other to transmit the necessary information for focusing.

The lens mount structure according to the present invention has the following advantages:

The electric contact section on the lens tube side can be located at the upper boundary between the left side area and the right side area of the interchangeable lens tube. Since the electric contact section on the camera side is usually provided near the upper cover member of the camera where an electric circuit of the camera is arranged, the electric contact section of the lens tube can be contacted with the electric contact section without any need of complicated wiring in the camera body.

The position of the transmission shaft in the lower portion between the first and third bayonet pawls is very convenient for coupling with the transmission member in the camera body without interference with other components. It enables locating the driving motor at the most optimum position. The transmission of the driving force to the lens system in the lens tube can be carried out very easily. The area in which the driving force-transmitting shaft is disposed is the area in which no bayonet pawl projects. Therefore, it is unnecessary to provide additional means for avoiding interference between the transmission shaft and any of the bayonet pawls. Therefore, the structure for arranging driving force transmission means can be simplified.

Other objects, features and advantages of the present invention will appear more fully from the following description taken in connection with the accompanying drawings.

BRIEF DESCRIPTION OF THE DRAWINGS

FIGS. 6 and 7 are enlarged views of the coupling shaft on the camera body as shown in FIG. 3, of which FIG. 6 shows the coupling shaft in the first position in which the shaft end projects beyond the mount reference surface and FIG. 7 shows the second position in which the shaft end is under the mount reference surface.

DESCRIPTION OF THE PREFERRED EMBODIMENT

Figure 1:
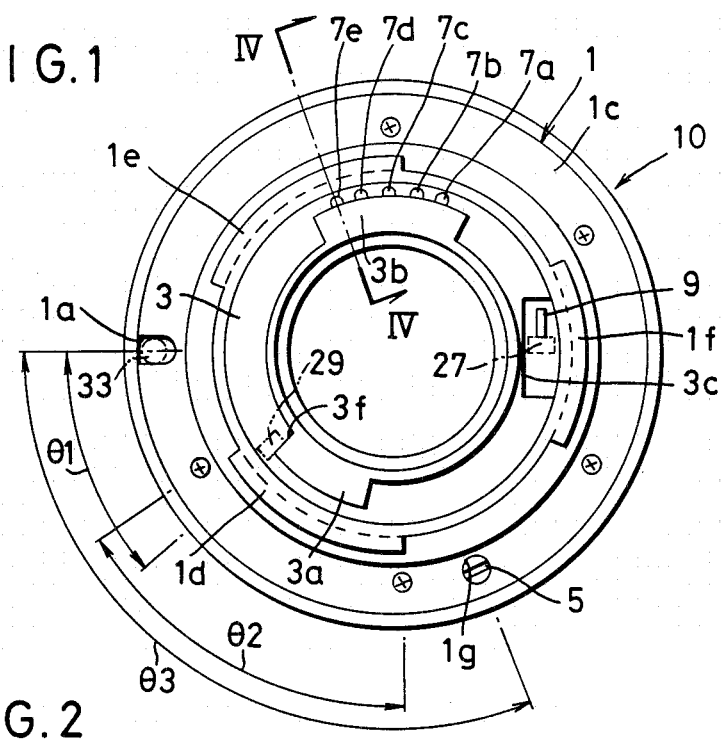
FIG. 1 is an elevational view of an interchangeable lens tube mounted on a camera looking from the camera side, showing an embodiment of the present invention.

Referring first to FIG. 1 there is shown an interchangeable lens tube generally designated by 10. The lens tube 10 has a lens system which is to be moved to focus in the direction along the optical axis. A lens mount 1 is provided on one end of the lens system. The lens mount 1 has three bayonet pawls 1d, 1e and 1f radially projected. Two of the bayonet pawls, 1d and 1e are arranged at the lower and upper sections in the left side area as viewed in FIG. 1. The intermediate section in the left side area forms a cutout. The remaining bayonet pawl 1f is located at the intermediate section in the right side area as viewed in FIG. 1.

Figure 2:
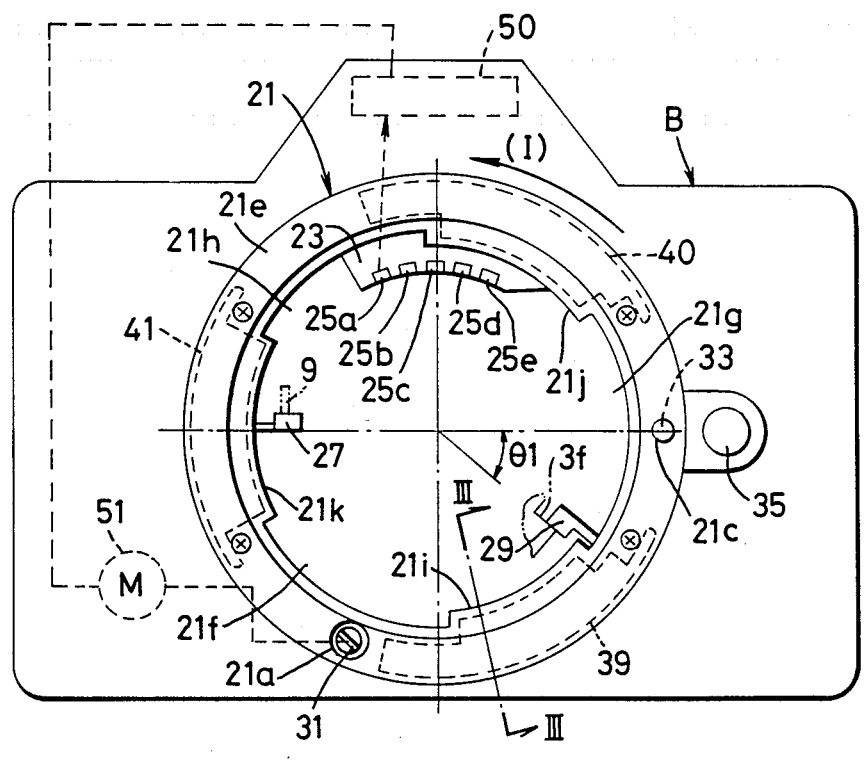
FIG. 2 is a front view of the camera body on which the interchangeable lens tube as shown in FIG. 1 is mounted.

FIG. 2 shows a camera body generally designated by B. The camera body B has a mount structure 21 for mounting the interchangeable camera tube 10 thereon. The camera mount 21 includes three cutouts 21f, 21g and 21h arranged along the inner circumference of the mount.

When the interchangeable lens tube 10 is mounted on the camera body B, one inserts the bayonet pawls 1d, 1e, 1f of the lens mount into the cutouts 21f, 21g, 21h of the camera mount respectively and then turns the lens tube in the direction of arrow (I) in FIG. 2 to bring the bayonet pawls 1d, 1e, 1f into engagement with the corresponding bayonet pawls 21i, 21j, 21k of the camera mount.

In this manner, the interchangeable lens tube 10 can be mounted on the camera body B through the camera mount 21 and the lens mount 1.

Figure 3:
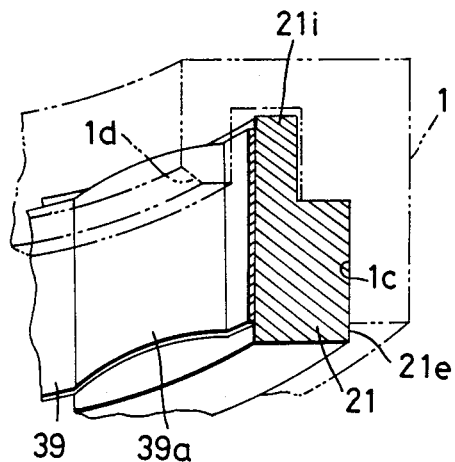
FIG. 3 is a perspective view of the section taken along the line III—III in FIG. 2, showing a bayonet pawl and a bayonet leaf spring.

The state of the engaged bayonet pawls is seen in FIG. 3, which is a sectional view looking along the line III—III in FIG. 2.

FIG. 3 shows, representatively, the manner of engagement between the bayonet pawl 1d of the lens mount and the bayonet pawl 21i of the camera mount. To eliminate play between the two pawls, a bayonet leaf spring 39 is provided on the camera bayonet pawl 21i. The leaf spring 39 has a bulge portion 39a formed at the middle of the spring. The elasticity of the bulge portion prevents any play between the bayonet pawls 1d and 21i. Although not shown in FIG. 3, similar leaf springs 40 and 41 are provided on other camera bayonet pawls 21j and 21k respectively.

As the bayonet pawls of the lens mount and the bayonet pawls of the camera mount are engaged with each other in the manner as shown above when the interchangeable lens tube 10 has been mounted on the camera body B, the reference surface 1c on the lens side and the reference surface 21e on the camera side are kept in intimate contact with each other so that the parallelism of the film plane in the camera body B to the lens reference plane 1c of the lens tube can be assured without fail.

When the interchangeable lens tube 10 is mounted on the camera body B, the relative position between them in the rotational direction is determined by a positioning pin 33. The positioning pin axially projects through a pin hole 21c formed in the camera mount 21. As shown in FIG. 1, the positioning pin 33 is engaged in a lock slot 1a formed in the lens mount 1 to achieve the positioning between the lens tube and the camera body.

As seen best from FIG. 1, the positioning lock slot 1a is formed at a point between the lens bayonet pawls 1d and 1e, that is, at the intermediate section of the left side area of the lens mount.

The interchangeable lens tube 10 can be detached from the camera body B very easily by depressing a detaching button 35. The button 35 is provided on the camera body B and can be moved in the direction normal to the plane of the drawing. When the button 35 is depressed in this direction, the positioning pin 33 is retracted from the lock slot 1a to allow the rotation of the lens tube 10 relative to the camera body B. Therefore, the bayonet joint between the lens tube and the camera body can be cancelled by rotating the lens tube 10 in the direction opposite to that for mounting described above after depressing the unlock button 35.

Referring again to FIG. 1, the interchangeable lens tube 10 has an inner tube 3 disposed inside the lens mount 1. On the inner tube 3 at its upper portion as viewed in FIG. 1, there is formed an electrical contact section 3b on which slidable contact pins 7a to 7e are arranged radially projecting from the contact section 3b.

Figure 4:
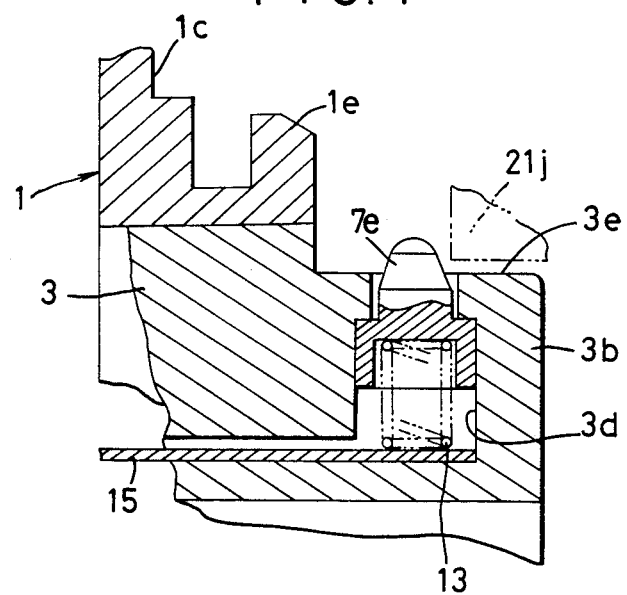
FIG. 4 is a sectional view taken along the line IV—IV in FIG. 1.

These electrical contact pins are slidably engaged in pin holes 3d and are biased outwardly of the contact section 3b by compressed coil springs 13 respectively as seen in FIG. 4.

Since each coil spring 13 is made of an electrically conductive material, the contact pins 7a–7e are electrically connected to an electrical circuit board 15. On the other hand, the camera body B, as shown in FIG. 2, has an electrical contact section 23 having contact surfaces 25a to 25e fixed on the section along a part of the inner circumference of the camera mount 21.

When the mounting of the lens tube 10 is completed, therefore, an electrical contact is formed between the slide contact pins 7a–7e and the fixed contact surfaces 25a–25e. In this position, an electrical connection is achieved between an electrical circuit 50 in the camera body B and the above-mentioned electric circuit board 15 in the lens tube 10. Through this electrical connection, data of the mounted lens such as maximum aperture value, focal length, various correcting information etc. can be transmitted to the electric circuit 50 in the camera body B.

The structure of a typical slide contact pin 7e is shown in FIG. 4. The top portion of the contact pin is conical and projects beyond the outer circumferential surface 3e of the electrical contact section 3b. This conical form of the projecting end portion of the slide contact pin prevents it from being damaged by a camera bayonet pawl or the like when the lens tube 10 is mounted. For example, if the camera bayonet pawl 21j strikes the slide contact pin 7e, the pawl easily rides on the top end of the pin along the slope of the conical portion and at the same time the slide pin is moved downwardly by the pawl 21j. There is no fear of the contact pin 7e being broken by the bayonet pawl.

Referring again to FIG. 1, the lens mount inner tube 3 has a cutout 3c on the opposite side to the previously mentioned lock slot 1a (the cutout 3c is at a position about 180° spaced from the lock slot 1a relative to the optical axis). In the cutout 3c there is a diaphragm-driving lever 9 which can be moved up and down in the plane of the drawing to stop down the aperture of a lens diaphragm (not shown). To operate the diaphragm-driving lever 9, the camera body B has a stop-down lever 27 (FIG. 2) shown by a phantom line in FIG. 1.

Further, on the reference surface 1c of the lens mount 1 there is a coupling shaft, 5 received in a through-hole 1g which is spaced by an angle $\theta_3$ (about 110°) counter-clockwise from the lock slot 1a. The coupling shaft 5 is supported for rotation and is engageable with a coupling shaft 31 (FIG. 2) standing from the reference surface 21e of the camera mount 21. The coupling shaft 31 on the camera body is connected with a motor 51 provided in the lower portion of the camera body B so that the rotational driving force of the motor 51 can be transmitted to a lens-moving mechanism (not shown) in the lens tube 10 through the coupling shaft 5. Therefore, according to the control of the auto-focusing device, the lens system of the interchangeable lens tube 10 can be moved for focusing by the motor 51. The manner of coupling between the two coupling shafts 31 and 5 will be described hereinafter with reference to FIGS. 5 to 7.

The coupling shaft 31 on the camera body normall projects beyond the reference surface 21e through a coupling hole 21a under the action of a biasing spring (not shown).

Figure 7:
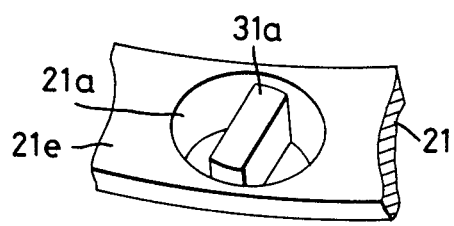

When the lens tube 10 is mounted on the camera body B, the reference surface 1c of the lens mount 1 pushes the coupling shaft 31 down into the coupling hole 21a as shown in FIG. 7.

Figure 5:
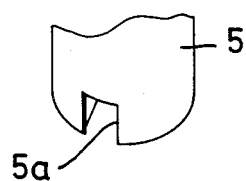
FIG. 5 is an enlarged perspective view of the coupling shaft on the lens tube as shown in FIG. 1.
Figure 6:
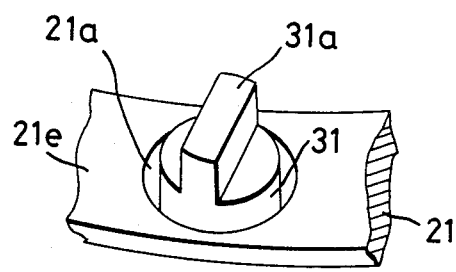

As shown in FIG. 5, the coupling shaft 5 has a receiving slit 5a on its forward end. On the other hand, the coupling shaft 31 has a projection 31a (FIG. 6) engageable in the slit 5a. When the mounting of the lens tube is completed, the projecting 31a of the coupling shaft 31 is engaged in the slit 5a of the coupling shaft 5 so that the rotational force of the driving motor 51 can be transmitted to the lens-moving mechanism. In this position, the positioning pin 33 of the camera body B is also engaged in the lock slot 1a of the lens tube 10. Therefore, the positioning of the interchangeable lens tube relative to the camera body has been completed.

When it is wished to detach the interchangeable lens tube 10 from the camera body B, one depresses the unlock button 35. In link with the downward movement of the unlock button, the projection 31a of the coupling shaft 31 also moves down under the reference surface 21e of the camera mount 21. Thus, the projection 31a is disengaged from the slit 5a of the coupling shaft 5 of the lens tube. In this position, one can rotate the interchangeable lens tube 10 relative to the camera body to disengage the lens bayonet pawls 1d, 1e, 1f from the camera bayonet pawls 21i, 21j, 21k. In this manner, the interchangeable lens tube 10 can be detached from the camera body B.

Referring again to FIG. 1, the lens mount inner tube 3 has a projection 3a at a position $\theta_1$ spaced counter-clockwise from the unlock slot 1a of the lens mount 1. The side surface of the projection 3a serves as a mechanical signal surface 3f. The angular position of the mechanical signal surface 3f is different from one to another according to the type of the interchangeable lens tube. For example, the angular distance $\theta_1$ of the signal surface 3f from the lock slot 1a gives some particular information of the interchangeable lens tube 10 such as the minimum F-number thereof.

When the lens tube 10 is mounted on the camera body B, the mechanical signal surface 3f comes into contact with and pushes a signal detection lever 29 provided on the camera body (FIG. 2). Thus, the signal detection lever 29 is moved a certain distance determined by the angle $\theta_1$ to transmit the information of the minimum F-number of the mounted interchangeable lens tube 10 to the camera body B. From the position of the signal detection lever thus moved, the camera forms a signal (for example, a minimum F-number signal) using an encoder or the like (not shown). The signal is introduced into the electric circuit 50 in the camera body B. As a matter of course, the mechanical signal surface 3f is required to assure a high accuracy of position detection. Otherwise, an error signal may be transmitted to the camera.

From this point of view, the shown arrangement of the lock slot 1a and the mechanical signal surface 3f is advantageous for minimizing the generation of such error signal. Since the signal surface 3f is located near the lock slot 1a where the play of the mounts 1, 21 and other error-producing factors are at the minimum, the highest possible accuracy of position can be obtained.

Hereinunder, the arrangement of the component members of the lens mount 1 will be described in further detail.

As previously mentioned referring to FIG. 1, the bayonet pawls 1d and 1e are arranged in the left side area of the lens mount 1 and the remaining bayonet pawl if is in the right side area. The lens diaphragm-driving lever 9 is positioned on the opposite side to the positioning mechanism comprising the lock slot 1a and the positioning pin 33. The lever 9 is spaced about 180° from the positioning mechanism regarding the optical axis as the center. This is because the location of the diaphragm-driving lever 9 is limited by a diaphragm-driving mechanism (not shown) within the camera body B.

The slide contacts 7a-7e on the lens tube 10 and the fixed contacts 25a-25e are arranged on the upper portions of the mounts 1 and 2 respectively with regard to the optical axis. In the case of a single-lens reflex camera, optical members such as a finder screen and a penta prism are usually arranged near the upper portion of the camera mount. Therefore, the electrical contacts, for which a relatively small space is required, are arranged in the upper area of the camera. The fixed contacts 25a-25e need a smaller space than the slide contacts 7a-7e. Therefore, the shown embodiment in which the fixed contacts have been arranged on the camera body B is particularly preferable because the contacts do not interfere with optical members such as a finder screen and a penta prism. The locking mechanism comprising the lock slot 1a and the positioning pin 33 of the lens mount is disposed between the two bayonet pawls 1d and 1e.

The coupling shafts 5 and 31 through which the driving force necessary for auto-focusing is transmitted must be arranged without any interference with the above-mentioned electric contacts 7a-7e, the aperture stop-down mechanism 9, 27 and the positioning mechanism 1a, 33. This gives rise to a difficulty in arranging the coupling shafts 31 and 5. Furthermore, the locations of the coupling shafts are limited by the following conditions:

The bayonet leaf springs 39, 40, 41 are arranged inside the bayonet pawls 21i-21k of the camera mount 21. The leaf springs have a width substantially equal to the width of the camera mount 21 as measured radially as indicated by dash lines in FIG. 2. This width of the bayonet leaf springs is needed to obtain the necessary biasing force.

Between the bayonet pawls 21j and 21k on the camera body there is the electric contact section 23 and between the bayonet pawls 21j and 21i there is the positioning pin 33. The coupling shaft 31 of the camera body B must be so disposed so as not to interfere with the leaf springs 39, 40, 41, the electric contact section 23 and the positioning pin 33, and so as not to interfere with all the bayonet pawls 21i-21k of the camera mount.

In addition, in the embodiment shown in FIG. 1, a projection 3a is provided to form the mechanical signal surface 3f in or near the angular range of $\theta_2$ in which the bayonet pawl 1d lies. In the camera body B, an encoder for the detection of the position of the signal detector 29 must be provided. The location of the encoder is limited to the range of interlocking movement of the signal detector 29 (in the range of the set angle $\theta_1$). Consequently, the coupling shaft 31 can not be located in this area.

Considering the above limitations and conditions, we have concluded that the optimum position for the coupling shaft 5 lies in the area between the bayonet pawls 1d and 1f (it corresponds to the area between bayonet pawls 21i and 21k on the side of the camera body B) and that it is preferable to dispose the coupling shaft 5 at a position spaced by an angle $\theta_3$ from the lock slot 1a as shown in FIG. 1.

One of the two coupling shafts is supported in such manner as to allow some play. By doing so, the coupling shaft 31 and the coupling shaft 5 can be coupled together even if there is some deviation from alignment between the two shafts. Since the level of the positional accuracy required for the coupling shafts is not so high, they are positioned relatively distant from the lock slot 1a, whereas the mechanical signal surface 3f, for which a high positional accuracy is required, is positioned relatively close to the lock slot 1a. The projection 3a having the mechanical signal surface 3f lies in substantially the same area as the range of $\theta_2$ of the bayonet pawl 1d, and the outer circumference of the projection 3a is on the inner side of the outer circumference of the bayonet pawl 1d. With this arrangement, therefore, the angular space corresponding to the range of $\theta_2$ can be utilized most effectively.

Obviously, various changes and modifications are possible in the embodiment within the scope of the present invention.

What we claim is:

1. A lens mount of a photographing lens tube attachable to a camera body containing a motor for driving a lens system along the optical axis for auto-focusing, said lens mount comprising:

a lens mount member fixed to the rear end of the photographing lens tube, said lens mount member having a reference surface extending normally to the optical axis;

first, second and third bayonet pawls radially projecting from the outer circumference of the lens mount member with a determined spacing between each bayonet pawl and said reference surface, said three bayonet pawls being arranged along the circumference with a determined spacing therebetween;

a lock slot for determining the rotational position of the lens mount member, formed on the reference surface between the first and second bayonet pawls;

a through-hole formed on the reference surface between the first and third bayonet pawls;

a transmission shaft rotatably supported in the through-hole for transmitting the driving force from the motor to the lens system;

electric contact means provided on the lens mount member in the vicinity of one end of the second bayonet pawl on the side near the third bayonet pawl for electrically connecting the photographing lens tube to the camera body; and a mechanical information-transmitting surface fixedly provided on the lens mount member in the vicinity of the first bayonet pawl, said surface being disposed so as to intersect the circumferential direction, the angle which said surface and the center of the lock slot form about the optical axis representing an optical characteristic of the photographing lens.

2. A lens mount of a photographing lens unit attachable to a camera body containing a motor for driving a lens system along the optical axis for auto-focusing, said lens mount comprising:

a lens mount member fixed to the rear end of the photographing lens unit, said lens mount member having a reference surface extending normally to the optical axis;

first, second and third bayonet pawls radially projecting from the outer circumference of the lens mount member with a determined spacing between each bayonet pawl and said reference surface, said three bayonet pawls being arranged along the circumference with a determined spacing therebetween, said first and second bayonet pawls being positioned at lower and upper left side portions of said lens mount member, respectively, and said third bayonet pawl being positioned at a right side portion of said lens mount member, as viewed from the rear of said photographing lens unit with the mounting of said lens unit on said camera body completed;

a lock slot for determining the rotational position of the lens mount member, formed on the reference surface between the first and second bayonet pawls;

a through-hole formed on the reference surface between the first and third bayonet pawls, said through-hole being positioned at a lower right side portion of said lens mount member as viewed from the rear of said photographing lens unit with the mounting of said lens unit on said camera body completed;

a transmission shaft rotatably supported in the through-hole for transmitting the driving force from the motor to the lens system; and electric contact means provided on the lens mount member in the vicinity of one end of the second bayonet pawl on the side near the third bayonet pawl for electrically connecting the photographing lens unit to the camera body.

3. A lens mount according to claim 2, wherein said lock slot is spaced about 180° from the third bayonet pawl about the optical axis, and wherein said electric contact means comprises slide contact members arranged along the circumference with its center lying at a point about 90° spaced from the lock slot about the optical axis.

4. A lens mount according to claim 2, which further comprises mechanical lens information-transmitting means provided in the vicinity of the first bayonet pawl and wherein the angular distance between the center of the lock slot and said mechanical information-transmitting means about the optical axis represents an optical performance of the photographing lens unit.

5. A lens mount according to claim 4, wherein said mechanical lens information-transmitting means includes a projection in the vicinity of the first bayonet pawl and the angular distance between one side surface of said projection and the center of said lock slot represents the minimum aperture ratio of the photographing lens unit.

6. A lens mount of a photographing lens unit attachable to a camera body containing a motor for driving a lens system along the optical axis for autofocusing, said lens mount comprising:

a lens mount member fixed to the rear end of the photograghing lens unit, said lens mount member having a reference surface extending normally to the optical axis;

first, second and third bayonet pawls radially projecting from the outer circumfernece of the lens mount member with a determined spacing between each bayonet pawl and said reference surface, said three bayonet pawls being arranged along the circumference with a determined spacing therebetween, said lens mount menber having an opening formed in the vicinity of said third bayonet pawl;

said first and second bayonet pawls being positioned at lower and upper left side portions of said lens mount member, respectively, and said third bayonet pawl being positioned at a right side portion of said lens mount member, as viewed from the rear of said photographing lens unit with the mounting of said lens unit on said camera body completed;

a lock slot for determining the rotational position of the lens mount member, formed on the reference surface between the first and second bayonet pawls;

a through-hole formed on the reference surface between the first and third bayonet pawls, said through-hole being positioned at a lower right side portion of said lens mount member as viewed from the rear of said photographing lens unit with the mounting of said lens unit on said camera body completed;

a transmission shaft rotatably supported in the through-hole for transmitting the driving force from the motor to the lens system;

electric contact means provided on the lens mount member in the vicinity of one end of the second bayonet pawl on the side near the third bayonet pawl for electrically connecting the photographing lens unit to the camera body; and a diaphrgm driving member having an end portion exposed in said opening and movable for driving a diaphragm of said photographing lens unit.

7. A lens mount according to claim 6, wherein said opening is at a position about 180° spaced from said lock slot relative to the optical axis.

* * * * *